(12) United States Patent
Zhang et al.

(10) Patent No.: US 10,164,790 B2
(45) Date of Patent: *Dec. 25, 2018

(54) METHOD FOR IMPLEMENTING AN INDUSTRY INTERNET FIELD BROADBAND BUS

(71) Applicant: KYLAND TECHNOLOGY CO., LTD., Beijing (CN)

(72) Inventors: Jianfeng Zhang, Beijing (CN); Zhiwei Yan, Beijing (CN)

(73) Assignee: KYLAND TECHNOLOGY CO., LTD., Beijing (CN)

( * ) Notice: Subject to any disclaimer, the term of this patent is extended or adjusted under 35 U.S.C. 154(b) by 161 days.

This patent is subject to a terminal disclaimer.

(21) Appl. No.: 15/264,177

(22) Filed: Sep. 13, 2016

(65) Prior Publication Data

US 2017/0373879 A1  Dec. 28, 2017

(30) Foreign Application Priority Data

Jun. 23, 2016 (CN) .......................... 2016 1 0467015

(51) Int. Cl.
*H04L 12/40* (2006.01)
*G06F 13/42* (2006.01)
(Continued)

(52) U.S. Cl.
CPC ...... *H04L 12/40013* (2013.01); *G06F 13/426* (2013.01); *G06F 13/4286* (2013.01); *H04L 12/2801* (2013.01); *H04L 12/40* (2013.01); *H04L 12/40123* (2013.01); *H04L 12/56* (2013.01); *H04L 27/26* (2013.01); *H04L 61/2038* (2013.01); *H04L 2012/40215* (2013.01)

(58) Field of Classification Search
None
See application file for complete search history.

(56) References Cited

U.S. PATENT DOCUMENTS

| 5,905,879 | A | * | 5/1999 | Lambrecht | ............... | H04N 7/24 |
| | | | | | | 348/E5.002 |
| 6,785,758 | B1 | * | 8/2004 | Kotlowski | ............ | G06F 13/372 |
| | | | | | | 370/392 |

(Continued)

FOREIGN PATENT DOCUMENTS

| JP | H03-155241 A | 7/1991 |
| JP | 2005-184616 A | 7/2005 |
| JP | 2011-077992 A | 4/2011 |

*Primary Examiner* — Duc T Duong
(74) *Attorney, Agent, or Firm* — Arent Fox LLP

(57) ABSTRACT

The invention relates to a method for implementing an industry internet field broadband bus, and in the method according to the invention, a bus controller and respective bus terminals transmit data in their respective time slices to thereby ensure timely and temporally determinist data transmission. Thus the embodiments of the invention implement a high-performance, highly reliable, and highly real-time method for implementing an industry internet field broadband bus. Moreover a transmission medium of the two-wire data transmission network can be a twisted pair or a shielded twisted pair so that the method according to the embodiment of the invention can be applicable to a traditional industry control facility using a bus, and thus can be highly universally applicable.

18 Claims, 2 Drawing Sheets

(51) Int. Cl.
*H04L 12/28* (2006.01)
*H04L 27/26* (2006.01)
*H04L 29/12* (2006.01)
*H04L 12/54* (2013.01)

(56) References Cited

U.S. PATENT DOCUMENTS

| | | | | |
|---|---|---|---|---|
| 2002/0116587 | A1* | 8/2002 | Modelski | G06F 9/3851 |
| | | | | 711/154 |
| 2004/0221113 | A1* | 11/2004 | Toyokura | G06F 13/1605 |
| | | | | 711/150 |
| 2004/0225781 | A1* | 11/2004 | Kotlowski | G06F 13/364 |
| | | | | 710/200 |
| 2007/0027485 | A1* | 2/2007 | Kallmyer | A61N 1/372 |
| | | | | 607/2 |
| 2009/0006675 | A1* | 1/2009 | Rofougaran | H05K 5/0278 |
| | | | | 710/62 |
| 2015/0311903 | A1* | 10/2015 | Frampton | H04B 3/542 |
| | | | | 700/287 |

* cited by examiner

METHOD FOR IMPLEMENTING AN INDUSTRY INTERNET FIELD BROADBAND BUS

CROSS-REFERENCE TO RELATED APPLICATIONS

This application claims the benefit of Chinese Patent Application No. 201610467015.8, filed with the State Intellectual Property Office of People's Republic of China on Jun. 23, 2016 and entitled "Method for Implementing an Industry Internet Field Broadband Bus", the content of which is hereby incorporated by reference in its entirety.

FIELD

The present invention relates to the field of communications, and particularly to a method for implementing an industry internet field broadband bus.

BACKGROUND

A serial bus has been increasingly applied in automatization and manufacturing, where all the users are connected by the serial bus into a network, and data are exchanged over the bus in a master-slave mode. In the prior art, there is a bus station system with an integrated bus supervision control function as illustrated in FIG. 1, where the system includes bus monitors added respectively to a control unit, a gateway, an executor, and a sensor to monitor in real time the data over the bus. The system has the networks interconnected by the gateway, and the number of bus monitors makes the bus system too complex in structure, costly in hardware, and difficult to manage and maintain later.

The Ethernet and the Controller Area Network (CAN) bus remain the mostly widely applied at present, but they also suffer particularly from the following drawbacks:

1) Since the Ethernet operates with Carrier Sense Multiple Access with Collision Detection (CSMA/CD), if the network is heavily loaded (more than 40%), then the deterministic network may not accommodate real-time industry control. For example, if a two-wire Ethernet transmission device communicates data with CSMA/CD, then the reliability of transmission in the system may be poor in this transmission mode.

2) The operating CAN bus is characterized in that the event trigger mechanism thereof causes events in the network to collide easily with each other, so that transmission over a channel may be subjected to an error and a jam, thus resulting in poor reliability of the system, and even if the collision can be resolved by arbitration, then data transmission at a low priority may not be real-time; and if master and slave stations operate, then the different stations in the distributed control system will need to be connected for communication, and one of the nodes will transmit information on its own initiative to the other nodes over the network at any instance of time without distinguishing the master station from the slave stations, so that the respective nodes communicating freely may occupy significant components of the channel, thus suppressing the transmission rate of the data over the channel, and degrading the performance of transmission.

At present, network transmission has been widespread all over the world, the security of transmit data influences directly the security of our working, living, and even nation, so it is highly desirable to provide a high-performance, highly reliable, and highly real-time method for implementing an industry internet field broadband bus.

SUMMARY

Embodiments of the invention provide a method for implementing an industry internet field broadband bus so as to address the problems of low performance of, and poorly real-time and reliable data transmission in the industry control system in the prior art.

In an aspect, an embodiment of the invention provides a method for implementing an industry internet field broadband bus, wherein the method is applicable to an industry internet field broadband bus architecture system including a bus controller and at least one bus terminal, the bus controller is connected with the respective bus terminals over a two-wire data transmission network, and the method including:

synchronizing in clock the bus controller with the respective bus terminals; and allocating, by the bus controller, time slices for the bus controller and the respective bus terminals so that the bus controller and the bus terminals transmit data to be transmitted, in their respective time slices.

In another aspect, an embodiment of the invention provides a method for implementing an industry internet field broadband bus, wherein the method is applicable to an industry internet field broadband bus architecture system including a bus controller and at least one bus terminal, the bus controller is connected with the respective bus terminals over a two-wire data transmission network, and the method including:

synchronizing in clock the respective bus terminals with the bus controller;

receiving, by the bus terminals, time slices allocated by the bus controller; and transmitting, by the bus terminals, data to be transmitted, in their respective time slices.

An advantageous effect of the invention is as follows: the bus controller and the respective bus terminals transmit data in their respective time slices to thereby ensure timely and temporally determinist data transmission. Thus the embodiments of the invention implement a high-performance, highly reliable, and highly real-time method for implementing an industry internet field broadband bus. Moreover a transmission medium of the two-wire data transmission network can be a twisted pair or a shielded twisted pair so that the methods according to the embodiments of the invention can be applicable to a traditional industry control facility using a bus, and thus can be highly universally applicable.

BRIEF DESCRIPTION OF THE DRAWINGS

In order to make the technical solutions according to the embodiments of the invention or in the prior art more apparent, the drawings to which a description of the embodiments or the prior art refers will be briefly introduced below, and apparently the drawings to be described below are merely illustrative of some of the embodiments of the invention, and those ordinarily skilled in the art can derive from these drawings other drawings without any inventive effort. In the drawings.

DETAILED DESCRIPTION OF THE EMBODIMENTS

In order to make the objects, technical solutions, and advantages of the embodiments of the invention more apparent, the technical solutions according to the embodiments of the invention will be described below clearly and fully with reference to the drawings in the embodiments of the invention, and apparently the embodiments described below are only a part but not all of the embodiments of the invention. Based upon the embodiments here of the invention, all the other embodiments which can occur to those skilled in the art without any inventive effort shall fall into the scope of the invention.

First Embodiment

Figure 1:
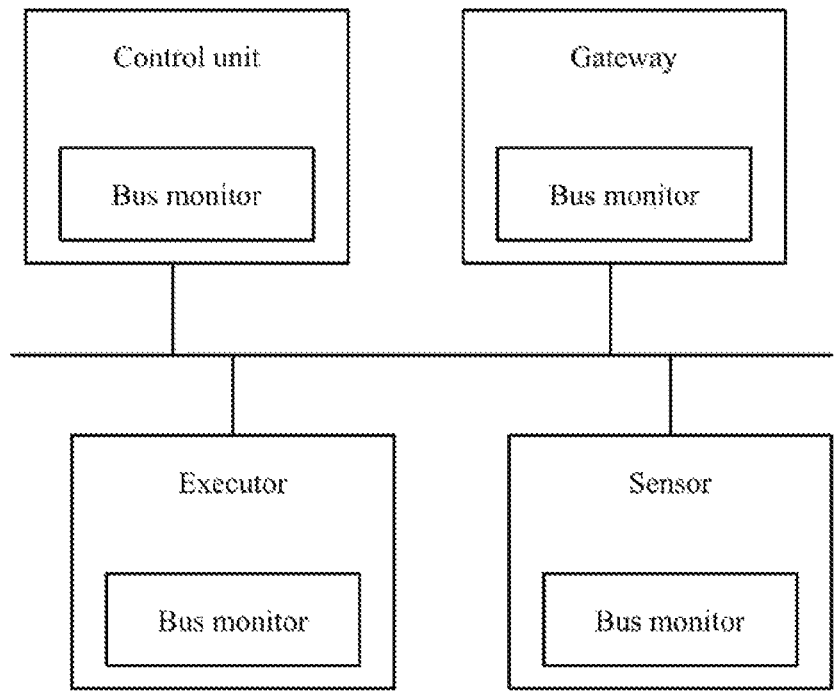
FIG. 1 illustrates a schematic structural diagram of the serial bus system in the prior art.
Figure 2:
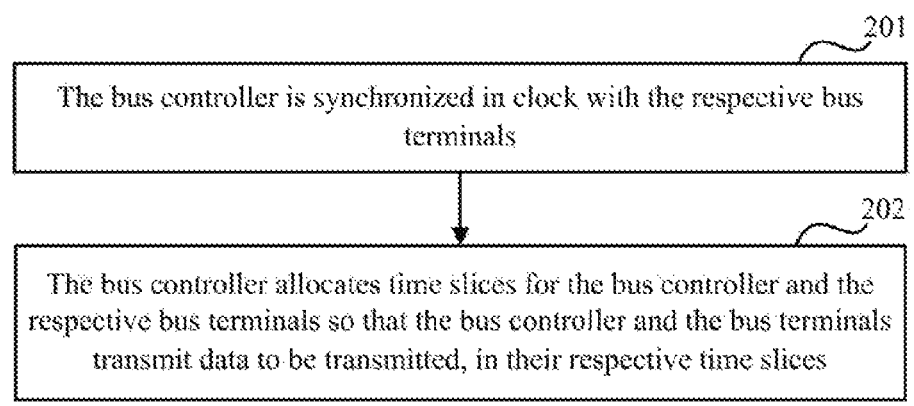
FIG. 2 illustrates a schematic flow chart of a method for implementing an industry internet field broadband bus according to a first embodiment of the invention.

As illustrated in FIG. 2, there is a schematic flow chart of a method for implementing an industry internet field broadband bus according to an embodiment of the invention, where the method is applicable to an industry internet field broadband bus architecture system including a bus controller and at least one bus terminal, the bus controller is connected with the respective bus terminals over a two-wire data transmission network, and the method includes the following operations:

In the operation 201, the bus controller is synchronized in clock with the respective bus terminals.

Here the operation 201 may be performed on any other appropriate occasion.

In the operation 202, the bus controller allocates time slices for the bus controller and the respective bus terminals so that the bus controller and the bus terminals transmit data to be transmitted, in their respective time slices.

Here in an embodiment, the bus controller and the bus terminals can be synchronized in clock in a precise clock synchronization protocol which can be the IEEE1588 protocol. Of course, in a particular implementation, they can alternatively be synchronized in clock in another protocol capable of precise clock synchronization, so the embodiment of the invention will not be limited thereto.

In the method according to the embodiment of the invention, the bus controller and the bus terminals are synchronized in clock in the precise clock synchronization protocol, and the bus controller allocates the time slices for the bus controller and the respective bus terminals so that the bus controller and the bus terminals transmit data to be transmitted, in their respective time slices to thereby ensure timely and temporally deterministic data transmission. Thus the embodiment of the invention provides a high-performance, highly reliable, and highly real-time method for implementing an industry internet field broadband bus. Moreover a transmission medium of the two-wire data transmission network can be a twisted pair or a shielded twisted pair so that the methods according to the embodiment of the invention can be applicable to a traditional industry control facility using a bus, and thus can be highly universally applicable.

In order to facilitate further understanding of the method for implementing an industry internet field broadband bus according to the embodiment of the invention, the invention will be further described below.

Here in an embodiment, in a real application, data over a broadband bus can include real-time data and non-real-time data, where the real-time data require highly temporally deterministic and timely data transmission, and the non-real-time data require less temporally deterministic and timely data transmission, so that in an embodiment of the invention, the data can be divided in advance into real-time data and non-real-time data so that different transmission strategies are applied to the different data. In an embodiment of the invention, the bus controller acquiring the data can further determine whether the data are real-time data or non-real-time data; and if the data are real-time data, then the bus controller will store the real-time data into a first real-time data container; otherwise, the bus controller will store the non-real-time data into a first non-real-time data container.

Thus first data to be transmitted can be transmitted by transmitting real-time data preferentially. Particularly the bus controller can transmit the data to be transmitted, in the time slice in the operation 202 as follows: the bus controller determines whether the bus controller operates in the time slice thereof, and if the bus controller operates in the time slice thereof, then the bus controller will retrieve the real-time data from the first real-time data container in the time slice as the first data to be transmitted, and transmit the first data; and if the real-time data container is empty, then the bus controller will retrieve the data from the first non-real-time data controller as the first real-time data, and transmit the first data.

It shall be noted that the bus controller needs to determine whether the first real-time data container is empty, before the non-real-time data are transmitted each time. By way of an example, the bus controller retrieves the data from the first real-time data container, and if the first real-time data container is empty, then the bus controller will retrieve the data from the first non-real-time data container as the first data to be transmitted, and transmit the first data; and then the bus controller further determines whether to retrieve the data from the first real-time data container, and if the first real-time data container is empty, then the bus controller will retrieve again the data from the first non-real-time data container as the first data to be transmitted, and transmit the first data. This is done for the reason that the real-time data may be newly generated aperiodically and added to the real-time data container. For example, if non-real-time data are transmitted, then new real-time data will be generated, and in order to ensure the real-time data to be transmitted in a timely manner, it will be necessary to determine that the real-time data container is empty, before the non-real-time data are transmitted each time.

Here in an embodiment, in order to make reasonable use of data transmission resources, the method further includes: if the bus controller does not operate in the time slice thereof, then the bus controller will retrieve the data from the first non-real-time data container, and transmit the retrieved non-real time data using carrier sense multiple access/collision detection (CSMA/CD).

Here in an embodiment, if it is determined that the data acquired are real-time data, then the data to be transmitted will be transmitted in the time slice in the operation 202 particularly by transmitting the data in the time slice using the Time-Triggered Ethernet (TTE) or TDMA.

Here in an embodiment, if it is determined that the acquired data are real-time data, then the data to be transmitted will be transmitted in the time slice particularly by transmitting the data in the time slice using the Time-Triggered Ethernet (TTE) or TDMA.

Here in an embodiment, in order to achieve good communication between the industry internet broadband bus and another network, the industry internet broadband bus is networked with another field bus network. In an embodiment of the invention, the method can further include the operations of: obtaining data to be transmitted to an external network, converting the data into a message in a format corresponding to the external network, and transmitting the message to the external network, where the external network can be a Process Field Bus, a Modbus communication protocol, a Controller Area Network (CAN), CANopen, RS485/CAN, etc., for example:

Here in an embodiment, in order to improve the security of the system, the method further includes:

The operation A1 is to learn MAC addresses of devices over the two-wire data transmission network, to allocate corresponding IP addresses and bus device addresses for the respective learnt MAC addresses, and to update a pre-created three-dimension correspondence relationship using the learnt MAC addresses, and the corresponding IP addresses and bus device addresses.

The operation A2 is to determine for each piece of data received over the two-wire data transmission network whether a correspondence relationship between a MAC address, an IP address, and a bus device address carried in the data is among the three-dimension correspondence relationship, and if so, to determine that the data are legal data; otherwise, to determine that the data are illegal data.

Thus the three-dimension correspondence relationship is equivalent to a white list, where data transmitted by a device in the white list are legal data, and data transmitted by a device out of the white list are illegal data, so that the illegal data can be avoided in effect from being transmitted and disseminated.

Here in an embodiment, in order to further improve the security of the system, in an embodiment of the invention, the three-dimension correspondence relationship can be further transmitted to the respective bus terminals so that the bus terminals can determine for each piece of data received over the two-wire data transmission network whether a correspondence relationship between a MAC address, an IP address, and a bus device address carried in the data is among the three-dimension correspondence relationship, and if so, then the bus terminals will determine that the data are legal data; otherwise, the bus terminals will determine that the data are illegal data.

Thus the three-dimension correspondence relationship are transmitted to the bus terminals so that the bus terminals are also provided with the white list, data transmitted by a device in the white list are legal data, and data transmitted by a device out of the white list are illegal data, so that the illegal data can be avoided in effect from being transmitted and disseminated by the bus terminals.

Here in an embodiment, in order to improve the efficiency of data transmission, the data to be transmitted can be transmitted in the time slice in the operation 202 by transmitting the first data to be transmitted, in the time slice thereof using orthogonal frequency division multiplexing (OFDM) or baseband transmission.

Here in an embodiment, orthogonal frequency division multiplexing is applicable at the physical layer. For example, the bus controller and the bus terminals modulate Ethernet data using orthogonal frequency division multiplexing (OFDM) at the physical layer to thereby transmit an Ethernet packet over a pair of data lines at a high speed. Moreover the bus controller and the bus terminal can also transmit an Ethernet packet using baseband transmission.

Here in an embodiment, in order to be monitored, the method can further include the following operations:

The operation B1 is to receive configuration information or a supervision instruction transmitted by a bus configuration and monitoring element for at least one device over the two-wire data transmission network.

The operation B2 is to transmit the configuration information or the supervision instruction to the corresponding device.

The operation B3 is to transmit running state information generated by the at least one device over the two-wire data transmission network to the bus configuration and monitoring element.

Here in an embodiment, the bus controller can communicate with the bus configuration and monitoring element over an RS485 bus so that this communication scheme is simple and applicable to a small amount of data. Alternatively if there is a large amount of data, then a time slice will be allocated for the bus configuration and monitoring element so that the bus configuration and monitoring element communicates with the bus controller in the time slice using orthogonal frequency division multiplexing (OFDM) or baseband transmission. Thus the configuration information and the supervision instruction in the system according to the embodiment of the invention can be systematically unified and global, and thus can well facilitate an industry field in which a large number of configuration and supervision operations are required.

Here in an embodiment, the bus configuration and monitoring element is primarily configured to configure parameters of the system according to the invention. Moreover in order to configure parameters of industry field devices, in an embodiment of the invention, application data requested by an application monitoring device can be further transmitted to the application monitoring device, where the application monitoring device accesses in real time, including data acquisition and real-time control, the bus controller and the respective bus terminals over the industry Ethernet broadband bus. Thus over their direct connections with the bus controller, the bus controller is responsible for unified allocation of time slots in which data of the bus system are passed, and the application monitoring device can transmit configuration parameters or acquisition commands and real-time control commands to be passed, directly in the time slots allocated by the bus controller in a unified manner for passing the data, so that a real-time access throughout the application monitoring system for data acquisition and real-time control can become more rapid and convenient.

Here the industry Ethernet broadband bus can be a two-wire data transmission network, or can be an Ethernet line, an RS485 bus, a serial interface bus, or another network capable of communication. In a particular implementation, the industry Ethernet broadband bus can be set as needed in reality, and the embodiment of the invention will not be limited thereto.

In an embodiment of the invention, the bus controller can allocate the time slices for the respective bus terminals particularly as follows:

The bus controller receives time slice allocation requests transmitted by the bus terminals, where the time slice allocation requests include the amounts of data to be transmitted of the bus terminals; allocates the time slices for the data to be transmitted of the bus terminals according to the amounts of data to be transmitted of the bus terminals, and unallocated time slices, and obtains time slice allocation information; and transmits the time slice allocation information of the bus terminals to the bus terminals so that the bus terminals transmits the data to be transmitted of the bus terminals according to the time slice allocation information.

Here in an embodiment, a limited amount of data can be transmitted in one time slice, and the numbers of time slices to be allocated can be determined as a function of the amounts of data to be transmitted of the bus terminals. Thus the time slice allocation information can include time slice identifiers of the respective allocated time slices so that the bus terminals can determine those time slices to be occupied by the bus terminals.

Thus the bus controller allocates the time slices for the bus terminals in response to the time slice allocation requests of the bus terminals so that the bus terminals can transmit the data to be transmitted, in their allocated time slices. In this way, the bus terminals can transmit the data in their respective time slices to thereby ensure temporally deterministic data transmission.

Here in an embodiment of the invention, in order to enable preferential transmission of important data to be transmitted, the time slice allocation requests can further include data identifiers of the data to be transmitted, so that the bus controller determines transmission levels of the data to be transmitted of the bus terminals according to the data identifiers. There are higher transmission levels corresponding to the important data to be transmitted of the bus terminals, and the time slices are allocated preferentially for the data at the higher transmission levels, so that the important data are transmitted preferentially. In an embodiment of the invention, this can particularly the following operations:

The operation C1 is to determine transmission priorities corresponding to the identifiers of the data to be transmitted of the bus terminals according to a pre-stored correspondence relationship between a data identifier and a transmission priority.

Here in an embodiment of the invention, the data identifiers can be identifies representing service types; for example, the data identifiers identify pressure sensor data, temperature sensor data, etc. As depicted in Table 1, there is an example of data identifiers at corresponding priorities, and of course, it shall be noted that Table 1 is merely intended to illustrate but not to limit an embodiment of the invention.

TABLE 1

| Data identifier | Priority | Remark |
| --- | --- | --- |
| 1 | High | Pressure sensor |
| 2 | Low | Device log |

The operation C2 is to allocate the time slices for the data to be transmitted of the bus terminals according to the determined transmission priorities, the amounts of data of the data to be transmitted of the bus terminals, and the unallocated time slices, and obtains the time slice allocation information.

Here in an embodiment of the invention, in order to secure transmitted data, the transmitted data are typically encrypted and then transmitted in the prior art to thereby prevent the data from being falsified while being transmitted, but the security of the encrypted original data may not be guaranteed; for example, an existing sensor (e.g., a pressure sensor, a temperature sensor, etc.) becomes increasingly intelligent, and acquired data may be falsified by the sensor before the data are encrypted (for example, the data are falsified by malicious program in the sensor, the data are falsified abnormally by the sensor, etc.), so in an embodiment of the invention, in order to further improve the security of transmitted data, the data to be transmitted can be further transmitted as follows:

The operation D1 is to receive data transmitted by data transmitting devices.

The operation D2 is to detect the data for at least one feature in a preset data feature library.

The operation D3 is to determine that the data are legal data, if at least one feature in the preset data feature library is detected.

The operation D4 is to issue an alarm if no feature in the preset data feature library is detected.

Here in an embodiment of the invention, the bus controller can subsequently process the data upon determining that the data are legal data; for example, if the data need to be transmitted to a next device, then the bus controller will transmit the data thereto. If the bus controller needs to be controlled using the data, then the bus controller will operate in response thereto.

Here in an embodiment of the invention, the alarm can include a source of the data so that a human operator can handle in response to the alarm.

Here in an embodiment of the invention, the preset data feature library can be created by acquiring at least one piece of sample data for creating the preset data feature library from the data transmitting devices, and creating a set of sample data; obtaining from the set of sample data at least one of data duration distribution features of the data being transmitted by the data transmitting devices, amount of data distribution features of the data being transmitted by the data transmitting devices, transmission time distribution features of the data being transmitted by the data transmitting devices, value range features of specified data, the identifiers of the data transmitting devices, network protocol information, service types corresponding to the data, etc.; and creating the preset data feature library from the obtained data feature information.

For example, if the data transmitting devices include pressure sensors, temperature sensors, and flow sensors, then corresponding data will be acquired from these data transmitting devices as the sample data resulting in the set of sample data.

For the sake of easy understanding, the respective data feature information will be described below by way of an example:

(1) The data duration distribution features of the data being transmitted by the data transmitting devices:

For example, some data transmitting device transmit their data each time for different durations dependent upon different service types; for example, a data transmitting device A transmits data each time for a duration of one minute, and a data transmitting device B transmits data each time for a duration of 30 seconds.

(2) The amount of data distribution features of the data being transmitted by the data transmitting devices:

For example, if the data transmitting device A transmits data T1 and data T2, where the amount of data T1 is T1', and the amount of data T2 is T2', then the amount of data distribution feature of the data transmitting device A includes T1' and T2'. More preferably the distribution feature can further include periods of time, for example, if the data T1 are transmitted in a period of time 1, then the amount of data corresponding to the period of time 1 will be T1'; and alike if the data T2 are transmitted in a period of time 2, then the amount of data corresponding to the period of time 2 will be T2'.

(3) The transmission time distribution features of the data being transmitted by the data transmitting devices:

For example, if the data transmitting device A typically transmits data at instances of time TIME1, TIME2, TIME3, and TIME4, then received data transmitted by the data transmitting device A at TIME5 will be abnormal data.

(4) The value range features of specified data:

For example, if a value detected by a pressure sensor typically lies in some range of values, then a data feature of data of the pressure sensor will be this range of values. Of course, more precisely, there may be different ranges of values of different pressure sensors.

(5) The identifiers of the data transmitting devices:

The identifiers of the data transmitting devices are identifies capable of identifying the devices uniquely, e.g., a Media Access Control (MAC) address, an Internet Protocol (IP) address, etc., (6) The network protocol information:

For example, the network protocol information includes the User Datagram Protocol (UDP), the Transmission Control Protocol (TCP), or other network protocols.

(7) The service types corresponding to the data:

For example, the service types include flow detection, temperature detection, speed detection, pressure detection, etc. In a particular implementation, the user can define the service types as needed in reality, all of which can be applicable to the embodiment of the invention, but the embodiment of the invention will not be limited thereto.

Second Embodiment

Figure 3:
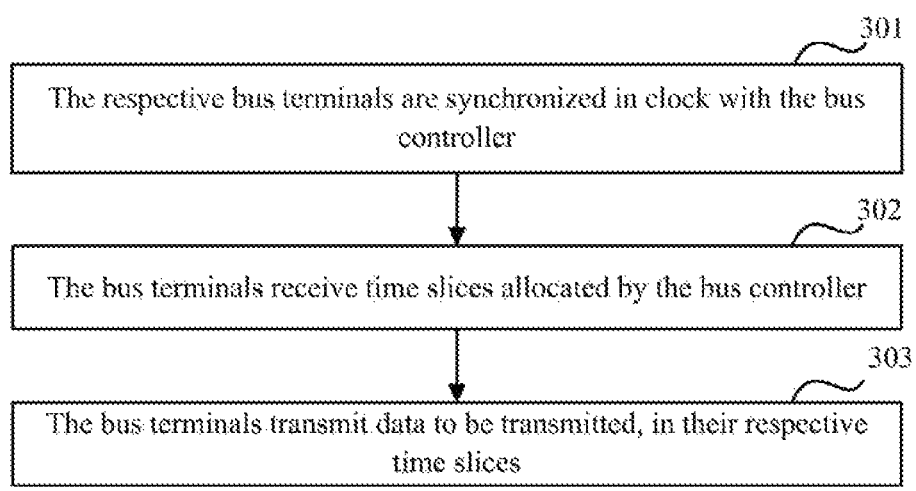
FIG. 3 illustrates a schematic flow chart of a method for implementing an industry internet field broadband bus according to a second embodiment of the invention.

Based upon the same inventive idea, an embodiment of the invention further provides a method for implementing an industry internet field broadband bus as illustrated in FIG. 3 which is a schematic flow chart of the method, where the method is applicable to an industry internet field broadband bus architecture system including a bus controller and at least one bus terminal, the bus controller is connected with the respective bus terminals over a two-wire data transmission network, and the method includes the following operations:

In the operation 301, the respective bus terminals are synchronized in clock with the bus controller.

Here the operation 301 may be performed on any other appropriate occasion.

In the operation 302, the bus terminals receive time slices allocated by the bus controller.

In the operation 303, the bus terminals transmit data to be transmitted, in their respective time slices.

Here in an embodiment of the invention, the bus terminals acquiring the data can further determine whether the data are real-time data or non-real-time data; and if the data are real-time data, then the bus terminals will store the real-time data into a second real-time data container; if the data are non-real-time data, the bus terminals will store the non-real-time data into a second non-real-time data container.

Here in an embodiment of the invention, in order to enable the bus terminals transmitting their data to be transmitted to transmit the real-time data preferentially, the bus terminals transmit the data to be transmitted, in their respective time slices particularly as follows: the bus terminals determine whether the bus terminals operate in their respective time slices, and if the bus terminals operate in their respective time slices, then the bus terminals will retrieve the real-time data from the second real-time data container in the time slice as the data to be transmitted of the bus terminals, and transmit the data; and if the real-time data container is empty, then the bus terminals will retrieve the data from the second non-real-time data controller as the data to be transmitted, and transmit the data.

Here in an embodiment of the invention, in order to make reasonable use of transmission resources, and to transmit the non-real-time data in a timely manner, in an embodiment of the invention, if the bus terminals do not operate in their respective time slices, then the bus terminals will retrieve the data from the second non-real-time data container, and transmit the retrieved non-real-time data using carrier sense multiple access/collision detection (CSMA/CD), so that the non-real-time data can be transmitted on a selected reasonable occasion to thereby improve the efficiency of data transmission, and the utilization ratio of data transmission resources.

Here in an embodiment, if it is determined that the acquired data are real-time data, then the bus terminals will transmit the data to be transmitted, in their respective time slices particularly by transmitting the data in their respective time slices using the Time-Triggered Ethernet (TTE) or TDMA.

Here in an embodiment, in order to further improve the security of the system, in an embodiment of the invention, the bus terminals can further receive a three-dimension correspondence relationship transmitted by the bus controller, and perform the following operations according to the three-dimension correspondence relationship: the bus terminals determine for each piece of data received over the two-wire data transmission network whether a correspondence relationship between a MAC address, an IP address, and a bus device address carried in the data is among the three-dimension correspondence relationship, and if so, then the bus terminals will determine that the data are legal data; otherwise, the bus terminals will determine that the data are illegal data.

Thus the bus terminals are provided with the white list, where data transmitted by a device in the white list are legal data, and data transmitted by a device out of the white list are illegal data, so that the illegal data can be avoided in effect from being transmitted and disseminated by the bus terminals.

The bus terminals can transmit the data to be transmitted, in their respective time slices particularly by transmitting the data to be transmitted of the bus terminals, in the time slices using orthogonal frequency division multiplexing (OFDM) or baseband transmission.

Here in an embodiment, orthogonal frequency division multiplexing (OFDM) is applicable at the physical layer. For example, the bus controller and the bus terminals modulate Ethernet data using orthogonal frequency division multiplexing (OFDM) at the physical layer to thereby transmit an Ethernet packet over a pair of data lines at a high speed. Moreover the bus controller and the bus terminal can also transmit an Ethernet packet using baseband transmission.

Here in an embodiment, in order to enable the bus terminals to detect the received data for features so as to secure the data, the bus terminals can particularly perform the following operations:

The operation F1 is to receive data transmitted by data transmitting devices;

The operation F2 is to detect the data for at least one feature in a preset data feature library;

The operation F3 is to determine that the data are legal data, if at least one feature in the preset data feature library is detected;

The operation F4 is to issue an alarm if no feature in the preset data feature library is detected.

Here in an embodiment, there may also be such data generated due to some accidental event in industry process control that need to be transmitted in a timely manner, and in view of this, in an embodiment of the invention, the bus terminals can be further configured to obtain the data to be transmitted of the bus terminals, determine from the data identifiers of the data to be transmitted of the bus terminals whether the data to be transmitted of the bus terminals are data of a preset accidental event; and if the data are data of a preset accidental event, then the bus terminals will transmit the data of the preset accidental event, so that in an embodiment of the invention, if data of a preset accidental event are generated, then the data of the preset accidental event will be transmitted preferentially regardless of whether there are data to be transmitted, in a time slice corresponding to the current instance of time, so that the important data of the accidental event can be transmitted preferentially Here in an embodiment, if the data are not data of any preset accidental event, then the bus terminals will determine from the data identifiers of the data to be transmitted of the bus terminals whether the data to be transmitted of the bus terminals include data required to be temporally deterministic, and if so, then the bus terminals will generate the time slice allocation request.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for implementing an industry internet field broadband bus, wherein the method is applicable to an industry internet field broadband bus architecture system comprising a bus controller and at least one bus terminal, the bus controller is connected with the respective bus terminals over a two-wire data transmission network, and the method comprising:

synchronizing in clock the bus controller with the respective bus terminals; and allocating, by the bus controller, time slices for the bus controller and the respective bus terminals so that the bus controller and the bus terminals transmit data to be transmitted, in their respective time slices;

wherein the method further comprises:

acquiring, by the bus controller, the data, and then determining whether the data are real-time data or non-real-time data; and if the data are real-time data, then storing the real-time data into a first real-time data container; if the data are non-real-time data, storing the non-real-time data into a first non-real-time data container.

2. The method according to claim 1, wherein transmitting, by the bus controller, the data to be transmitted, in the time slice thereof comprises:

determining whether the bus controller operates in the time slice thereof; and if the bus controller operates in the time slice thereof, then retrieving the real-time data from the first real-time data container in the time slice as the data to be transmitted, and transmitting the data; and if the real-time data container is empty, then retrieving, the data from the first non-real-time data controller as the data to be transmitted, and transmitting the data.

3. The method according to claim 2, wherein the method further comprises:

if the bus controller does not operate in the time slice thereof, then retrieving the data from the first non-real-time data container, and transmitting the retrieved non-real time data using carrier sense multiple access/collision detection (CSMA/CD).

4. The method according to claim 1, wherein if it is determined that the data acquired are real-time data, then transmitting, by the bus controller, the data to be transmitted, in the time slice thereof comprises:

transmitting the data in the time slice using the Time-Triggered Ethernet (TTE) or Time Division Multiple Access (TDMA).

5. The method according to claim 1, wherein the method further comprises:
obtaining data to be transmitted to an external network, and then converting the data into a message in a format corresponding to the external network, and transmitting the message to the external network.

6. The method according to claim 1, wherein the method further comprises:
learning, by the bus controller, Media Access Control (MAC) addresses of devices over the two-wire data transmission network, allocating corresponding Internet Protocol Address (IP) addresses and bus device addresses for the respective learnt MAC addresses, and updating a pre-created three-dimension correspondence relationship using the learnt MAC addresses, and the corresponding IP addresses and bus device addresses; and
determining for each piece of data received over the two-wire data transmission network whether a correspondence relationship between a MAC address, an IP address, and a bus device address carried in the data is among the three-dimension correspondence relationship, and if so, then determining that the data are legal data; otherwise, determining that the data are illegal data.

7. The method according to claim 1, wherein transmitting, by the bus controller, the data to be transmitted, in the time slice thereof comprises:
transmitting the data to be transmitted, in the time slice thereof using orthogonal frequency division multiplexing (OFDM) or baseband transmission.

8. The method according to claim 7, wherein the orthogonal frequency division multiplexing operates at the physical layer.

9. The method according to claim 1, wherein the method further comprises:
receiving, by the bus controller, configuration information or a supervision instruction transmitted by a bus configuration and monitoring element for at least one device over the two-wire data transmission network;
transmitting the configuration information or the supervision instruction to the corresponding device; and
transmitting running state information generated by the at least one device over the two-wire data transmission network to the bus configuration and monitoring element.

10. The method according to claim 9, wherein the bus controller communicates with the bus configuration and monitoring element over an RS485 bus; or
the bus controller allocates a time slice for the bus configuration and monitoring element so that the bus configuration and monitoring element communicates with the bus controller in the time slice using orthogonal frequency division multiplexing or baseband transmission.

11. The method according to claim 1, wherein the method further comprises:
transmitting, by the bus controller, application data requested by an application monitoring device can be further transmitted to the application monitoring device.

12. A method for implementing an industry internet field broadband bus, wherein the method is applicable to an industry internet field broadband bus architecture system comprising a bus controller and at least one bus terminal, the bus controller is connected with the respective bus terminals over a two-wire data transmission network, and the method comprising:
synchronizing in clock the respective bus terminals with the bus controller;
receiving, by the bus terminals, time slices allocated by the bus controller; and
transmitting, by the bus terminals, data to be transmitted, in their respective time slices;
wherein the method further comprises:
acquiring, by the bus terminals, the data, and then determining whether the data are real-time data or non-real-time data; and if the data are real-time data, then storing the real-time data into a second real-time data container; if the data are non-real-time data, storing the non-real-time data into a second non-real-time data container.

13. The method according to claim 12, wherein transmitting, by the bus terminals, the data to be transmitted, in their respective time slices comprises:
determining whether the bus terminals operate in their respective time slices, and if the bus terminals operate in their respective time slices, then retrieving the real-time data from the second real-time data container in the time slice as the data to be transmitted of the bus terminals, and transmitting the data; and if the real-time data container is empty, then retrieving the data from the second non-real-time data controller as the data to be transmitted, and transmitting the data.

14. The method according to claim 13, wherein the method further comprises: if the bus terminals do not operate in their respective time slices, then retrieving the data from the second non-real-time data container, and transmitting the retrieved non-real-time data using carrier sense multiple access/collision detection (CSMA/CD).

15. The method according to claim 12, wherein if it is determined that the data acquired are real-time data, then transmitting, by the bus terminals, the data to be transmitted, in their respective time slices comprises:
transmitting the data in the time slices using the Time-Triggered Ethernet (TTE) or TDMA.

16. The method according to claim 15, wherein the method further comprises:
determining, by the bus terminals, for each piece of data received over the two-wire data transmission network whether a correspondence relationship between a MAC address, an IP address, and a bus device address carried in the data is among the three-dimension correspondence relationship, and if so, then determining that the data are legal data;
otherwise, determining that the data are illegal data.

17. The method according to claim 12, wherein transmitting, by the bus terminals, the data to be transmitted, in the time slices thereof comprises:
transmitting the data to be transmitted of the bus terminals, in the time slices using orthogonal frequency division multiplexing (OFDM) or baseband transmission.

18. The method according to claim 17, wherein the orthogonal frequency division multiplexing operates at the physical layer.

* * * * *